Aug. 19, 1924.

C. R. YATES

SAFETY DRIVING LIGHT

Filed Oct. 31, 1923

1,505,615

Witnesses
Theo. J. Klietz
Fred E. Paesler

Inventor
Charles R. Yates
by
Attys.

Patented Aug. 19, 1924.

1,505,615

UNITED STATES PATENT OFFICE.

CHARLES R. YATES, OF CULVER, INDIANA.

SAFETY DRIVING LIGHT.

Application filed October 31, 1923. Serial No. 671,849.

*To all whom it may concern:*

Be it known that I, CHARLES R. YATES, a citizen of the United States, and a resident of Culver, in the county of Marshall and State of Indiana, have invented certain new and useful Improvements in Safety Driving Lights; and I do hereby declare that the following is a full, clear, and exact description of the same, reference being had to the accompanying drawings, and to the numerals of reference marked thereon, which form a part of this specification.

This invention relates to safety driving lights, and particularly to an auxiliary illuminating system for vehicles wherein proper highway or street illumination is combined with the display of warning or indicating lights defining the front extremities of the vehicle.

Spotlights and headlights as ordinarily provided either fail to properly illuminate the surface traversed by the vehicle or are so brilliant as to interfere with the vision of occupants of other vehicles. Bright spotlights as ordinarily mounted, because of reflected light, sometimes interfere with the vision of the driver of the vehicle on which they are mounted. It is also recognized that failure to define the front extremities of a vehicle by illuminated indicating signals greatly increases the danger of accidents.

This invention has, therefore, for an important object the provision of an illuminating system whereby the right-hand side of the highway is effectively illuminated without interfering with the driver's vision and without interfering with the vision of occupants of oncoming vehicles.

It is a further important object of this invention to provide a plurality of illuminating means adapted to define the front extremities of a vehicle, one or more of said illuminating means being adjustable.

Other and further important objects of this invention will be apparent from the disclosures in the specification and the accompanying drawings.

The invention (in a preferred form) is illustrated in the drawings and hereinafter more fully described.

Figure 1:
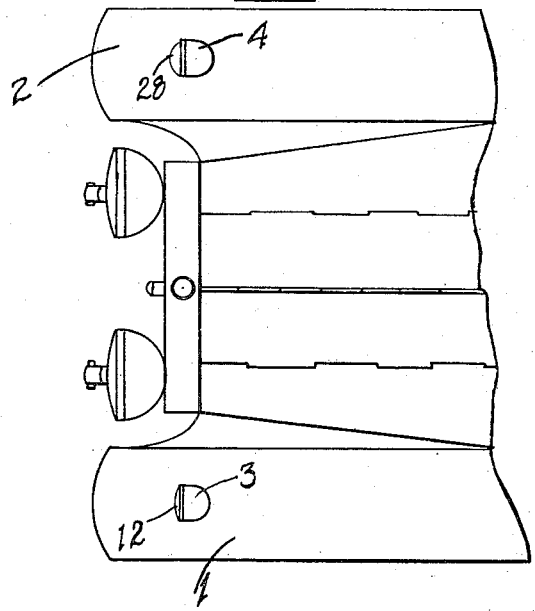
Figure 1 is a fragmentary top plan view of an automotive vehicle equipped with the safety driving lights of this invention.
Figure 2:
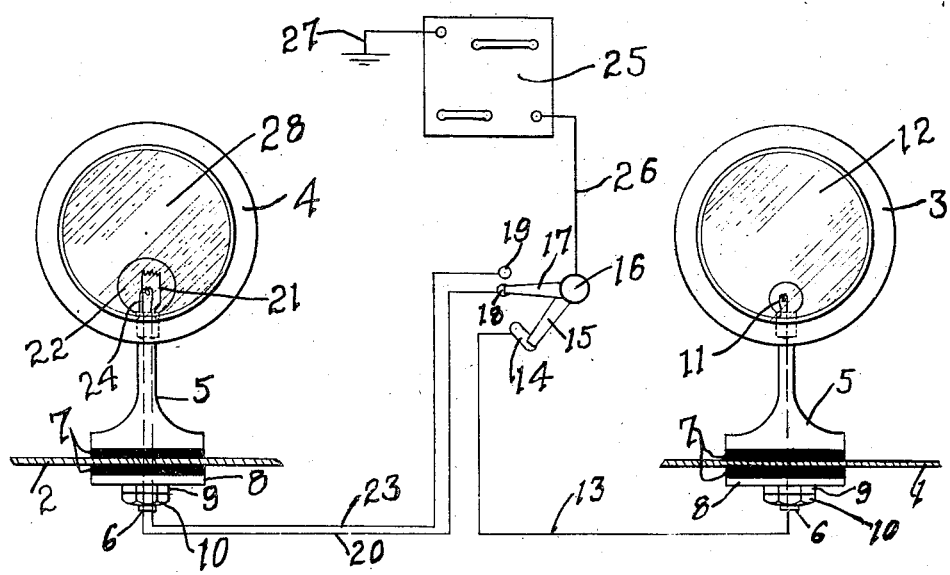
Figure 2 is a fragmentary diagrammatic view illustrating the method of mounting the driving lights and the electrical connections thereto.

The safety driving lights of this invention are preferably mounted on the front fenders of the automotive vehicle, a warning or indicating signal which preferably projects red light being mounted on the left-hand fender 1 and a spotlight or highway illuminating unit for projecting light on the right-hand side of the highway being mounted on the right-hand fender 2. In the drawings I have indicated the casing enclosing the left-hand light by the reference numeral 3 and the casing enclosing the right-hand light by the reference numeral 4. These casings are mounted on the fenders on suitable brackets 5 which are secured to the fenders by studs 6 extending therethrough, insulating washers 7 being interposed between the fender and the bracket and stud on each side of the fender, the lower insulating washer in each case resting on a supplemental metal washer 8, the entire assembly being firmly secured in proper relation by nuts 9 and locknuts 10. The insulating washers 7 are used to electrically insulate the brackets 5 from the frame of the motor vehicle where a return wire electric circuit is used, but in case a ground return circuit is used the studs 6 are allowed to contact with the fenders so as to allow the ground return to the battery through the vehicle frame. For purposes of simplicity, such a ground return electric circuit is shown herein.

A usual incandescent electric bulb 11 is mounted in the casing 3 and the front end of said casing is closed by a transparent member 12 which is preferably red in color but which may be of any desired color. One terminal of said electric bulb 11 is grounded in the usual manner, and leading from the other terminal thereof out through the bracket 5 and stud 6 is an electric conductor 13 which is connected to a contact switch plate 14 which is adapted to be slidably contacted by one arm 15 of a switch which is pivoted at 16 and the other arm 17 of which is movable with the arm 15 and is adapted to selectively engage contacts 18 and 19. The contact 18 has connected thereto an electric conductor 20 which leads to one terminal of a bright filament 21 in an incandescent electric bulb 22 which is mounted in the casing 4 in the usual manner, one terminal thereof being grounded. The contact 19 has connected thereto an electric conductor 23 which leads to a dim filament 24 also mounted in the bulb 22. The common or pivotal point 16 of the switch is connected to one terminal of a usual storage battery or other source of electrical energy 25 through a conductor 26, the other terminal of said storage battery being grounded at 27 in the usual manner.

The casing 4 is preferably provided with a concentrated type of reflector and lens 28 so that the light projected therefrom may be directed to a desired portion of the surface traveled over, preferably along the edge of the ditch or the curb at the right-hand side of the highway. The position of the casing 4 may be adjusted so that this light is thrown in a desired direction by loosening the nuts 9 and 10 and turning the casing to a desired position, after which the nuts may be tightened to retain the unit in place. The casing 3, of course, may be similarly adjusted if desired.

By making the contact 14 oblong, as indicated in the drawings, it is possible to maintain the illumination of the bulb 11 in either position of the arm 17, that is whether the bright or dim filament of the bulb 22 is illuminated.

It will be apparent that this invention provides means whereby the extremities of the front portion of the vehicle are defined so that they may be seen by the occupants of passing or oncoming vehicles and at the same time means are provided for efficiently illuminating the right-hand side of the highway without interfering in any way with the vision of occupants of oncoming vehicles or with the vision of the driver of the vehicle itself. The safety driving lights provided by this invention are designed to enhance the appearance of the vehicle on which they are mounted and at the same time to add greatly to the safety of night driving.

As will be observed, these lights, because of their simple construction, may be constructed and installed at a minimum expense.

I am aware that numerous details of construction may be varied through a wide range without departing from the principles of this invention, and I therefore do not purpose limiting the patent granted otherwise than necessitated by the prior art.

I claim as my invention:

1. The combination with a vehicle and the front fenders thereof, of an illuminating unit mounted on each of said fenders, one of said units projecting light of a distinctive color to serve as an indicating or warning signal and the other thereof projecting light to illuminate the surface traveled over.

2. The combination with a vehicle, of an illuminating unit mounted substantially at the front extremity of each side thereof, each of said units being adapted to project light of a different color, and one of said units being adapted to project light of varying intensity.

In testimony whereof I have hereunto subscribed my name in the presence of two subscribing witnesses.

CHARLES R. YATES.

Witnesses:
CARL M. ADAMS,
HELEN J. KRUMAN.